(12) United States Patent
Armbruster et al.

(10) Patent No.: US 12,409,777 B2
(45) Date of Patent: Sep. 9, 2025

(54) METHOD FOR OPERATING A HEADLIGHT DEVICE OF A MOTOR VEHICLE AND MOTOR VEHICLE

(71) Applicant: AUDI AG, Ingolstadt (DE)

(72) Inventors: Tilman Armbruster, Ingolstadt (DE); Quirin Veni, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 18/612,124

(22) Filed: Mar. 21, 2024

(65) Prior Publication Data

US 2024/0317134 A1    Sep. 26, 2024

(30) Foreign Application Priority Data

Mar. 23, 2023    (DE) ...................... 10 2023 107 334.6

(51) Int. Cl.
*B60Q 1/50*    (2006.01)
(52) U.S. Cl.
CPC ............. *B60Q 1/525* (2013.01); *B60Q 1/543* (2022.05); *B60Q 2300/31* (2013.01); *B60Q 2400/50* (2013.01)
(58) Field of Classification Search
CPC .... B60Q 1/525; B60Q 1/543; B60Q 2300/31; B60Q 2400/50
See application file for complete search history.

(56) References Cited

U.S. PATENT DOCUMENTS 11,850,995 B2    12/2023    Funke et al.
2013/0058116 A1    3/2013    Galbas et al.
(Continued)

FOREIGN PATENT DOCUMENTS

DE    102011081382 A1    2/2013
DE    202013006071 U1    11/2013
(Continued)

OTHER PUBLICATIONS

Yang Liu, Shougian Sun and Aiguo Xu, "3D virtual garment design system," 2008 12th International Conference on Computer Supported Cooperative Work in Design, Xi'an, China, 2008, pp. 733-736.

*Primary Examiner* — Hoi C Lau
(74) *Attorney, Agent, or Firm* — Sterne, Kessler, Goldstein & Fox P.L.L.C.

(57)    ABSTRACT

A method for operating a headlight device of a motor vehicle, wherein the headlight device comprises a projection device and a control unit which is designed to control the projection device for projecting a predetermined light pattern in a predetermined projection region of the projection device. The light pattern in a polygon operating mode of the headlight device comprises a polygon mesh with polygon surfaces having polygon edges defined by projection points as corner points. At least partially different projection brightnesses are assigned to the polygon surfaces, wherein at least one physical property is assigned to at least one polygon feature of the polygon surfaces, in particular at least to the corner points, wherein, for dynamic adjustment of the light pattern in a dynamic submode of the polygon operating mode: time-current operating data of the motor vehicle and/or measurement data of the motor vehicle are recorded, which describe the driving state of the motor vehicle and/or environmental features relevant to the physical property in an environment of the motor vehicle encompassing the projection region, an environment model is provided based on the operating data and/or measurement data, at least for the projection region, and the polygon mesh is adjusted before the light pattern is output on the basis of a computationally determined item of adjustment information that describes a virtual physical interaction of the polygon sur- (Continued)

faces with the environment model on the basis of the at least one assigned physical property.

18 Claims, 7 Drawing Sheets

(56) References Cited

U.S. PATENT DOCUMENTS

| | | | |
|---|---|---|---|
| 2018/0118099 A1* | 5/2018 | Kunii | B60K 35/10 |
| 2020/0355347 A1 | 11/2020 | Le Corre et al. | |
| 2024/0083344 A1* | 3/2024 | Takori | B60Q 1/085 |
| 2024/0083348 A1* | 3/2024 | Takori | B60Q 1/18 |
| 2024/0092248 A1* | 3/2024 | Takori | B60Q 1/1415 |
| 2024/0183506 A1* | 6/2024 | Courcier | F21S 43/26 |
| 2024/0241225 A1* | 7/2024 | Goren | G01S 7/484 |
| 2024/0241236 A1* | 7/2024 | Weiss | G01S 7/4972 |
| 2024/0241249 A1* | 7/2024 | Avivi | G01S 17/931 |
| 2024/0255645 A1* | 8/2024 | Keilaf | G01S 7/497 |
| 2024/0317134 A1* | 9/2024 | Armbruster | B60Q 1/507 |
| 2024/0418841 A1* | 12/2024 | Dgani | G01S 7/4972 |
| 2025/0180707 A1* | 6/2025 | Eshel | G01S 17/42 |

FOREIGN PATENT DOCUMENTS

| | | | | |
|---|---|---|---|---|
| DE | 102020112844 B3 | 9/2021 | | |
| DE | 102020007760 A1 | 6/2022 | | |
| DE | 102021118839 B3 | 10/2022 | | |
| DE | 102021116425 A1 | 12/2022 | | |
| EP | 3476663 A1 | 5/2019 | | |
| WO | WO-2023001948 A1 * | 1/2023 | | H04N 9/3182 |

* cited by examiner

METHOD FOR OPERATING A HEADLIGHT DEVICE OF A MOTOR VEHICLE AND MOTOR VEHICLE

TECHNICAL FIELD

The present disclosure relates to a method for operating a headlight device of a motor vehicle, wherein the headlight device has a projection device and a control unit which is designed to control the projection device for projecting a predetermined light pattern in a predetermined projection region of the projection device, wherein the light pattern in a polygon operating mode of the headlight device comprises a polygon mesh with polygon surfaces having polygon edges defined by projection points as corner points, and the polygon surfaces are at least partially assigned different projection brightnesses. In addition, the present disclosure relates to a motor vehicle.

BACKGROUND

Light functions in motor vehicles are traditionally used in a familiar way to illuminate the region in front of the motor vehicle for the driver driving at night and to make the vehicle recognizable to other road users, especially at night. For this purpose, motor vehicles have, for example, headlights for illuminating the region in front of the motor vehicle, which can be operated for example in a plurality of operating modes such as low beam, high beam, daytime running light, and the like. Motor vehicles are also standardly equipped with taillights, direction indicators, brake lights, and the like.

For headlights in particular, other functionalities have already been proposed in the prior art in order to provide assistance to the driver and/or other road users, to increase safety and to make the light more interesting or more comfortable to look at. Particularly helpful in this context is the development of headlights whose entire illumination region is divided into segments that can be controlled independently, i.e. can be illuminated independently. It is known for example to use optics and/or special light source arrangements for this purpose, such as micromirror arrangements in which each micromirror can be assigned to a segment, and/or LED matrices. Such headlights can also be referred to as digital matrix light and can be used, for example, to avoid dazzling other road users by deactivating certain segments, and to offer functions such as navigation light and cornering headlights.

EP 3 476 663 A1 relates to a lighting device for a motor vehicle. The lighting device comprises a first lighting unit for emitting light of a first light distribution pattern and a second lighting unit for emitting light of a second light distribution pattern. In order to be able to correct a position deviation from a specific target position on a road surface, the first light distribution pattern and the second light distribution pattern can have a main pattern and an auxiliary pattern with an assistance function.

US 2020/0355347 A1 discloses a lighting device for emitting patterns onto a road surface as a travel direction indicator.

DE 10 2021 118 839 B3 relates to a vehicle having a headlight device. The headlight device comprises a projection device and a control unit, wherein the control unit is configured to control the projection device for projecting a predefined light pattern in a predetermined projection region of the projection device. In the control unit there is stored a point map in which projection points are defined at the respective projection point coordinates in the predetermined projection region. The control unit is set up to adjust a position of the projection point coordinates according to a predetermined distortion method in dependence on a detected height profile of a surface and to decompose the light pattern into at least one polygonal surface according to a predetermined decomposition method, the corner points of which are each defined by a corresponding one of the projection points. Using a sensor device, the topography of the surface on which the specific projection region is located can be detected, wherein the pre-distortion method compensates for the height profile of the surface, so that the light pattern is shown to the driver in the predetermined shape independently of the height profile. The control unit can furthermore be configured to assign an illumination stage to the at least one polygonal surface after the predetermined decomposition method.

It can thus be said that projection devices which project polygon meshes onto a surface on which a motor vehicle is driving have been proposed. However, possible applications have so far been limited to a few special cases; for example DE 10 2020 007 760 A1 proposes the use of a light pattern of at least two polygonal surfaces that are differently illuminated in order to classify road markings.

DE 10 2011 081 382 A1 relates to a method and a device for modifying a light emission of at least one headlight of a vehicle. There it is proposed to determine a position of an object in front of or next to the vehicle and to change the light emission of at least one headlight onto the object using the corresponding position signal, wherein a changing illumination pattern is emitted onto the object or into a surrounding environment of the object when the change is made. The aim is to issue a warning to the driver of the vehicle in a way that is technically very simple to carry out. The lighting pattern can have one sub-region with a high brightness and another sub-region with a low brightness, wherein the brighter sub-region moves. Through different lighting patterns, the driver can learn about different hazards and thus build up fast reaction times to hazards.

BRIEF DESCRIPTION OF DRAWINGS/FIGURES

Additional advantages and details of the present disclosure are shown in the embodiments described hereinafter and from the drawings, In the figures.

Figure 5:
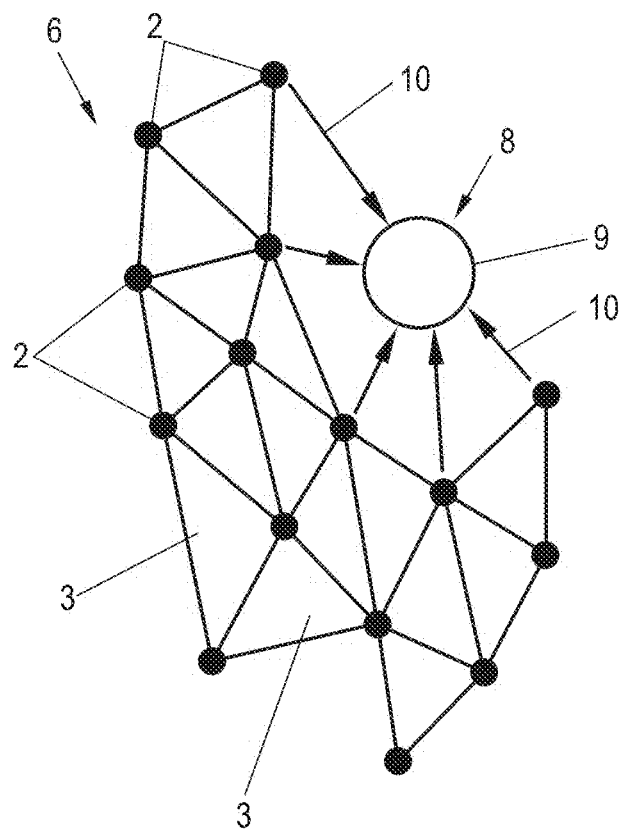
Figure 6:
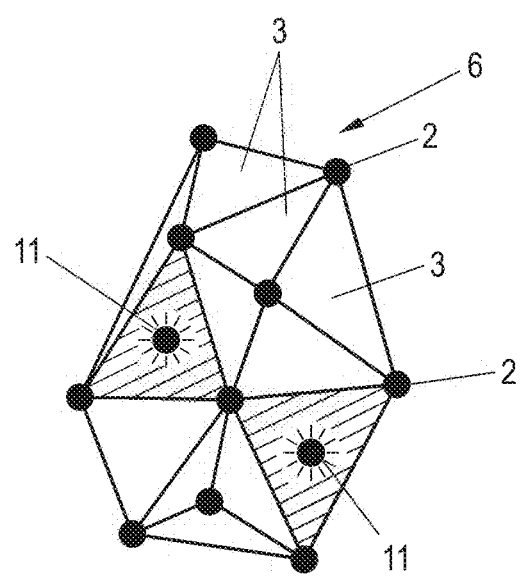
Figure 10:
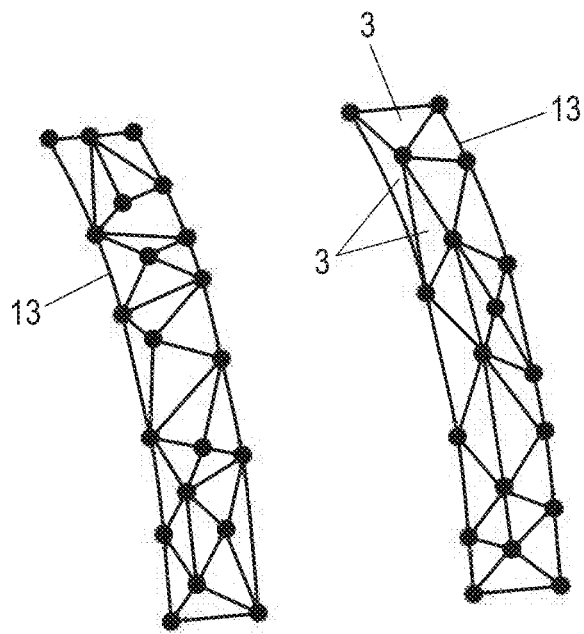
Figure 11:
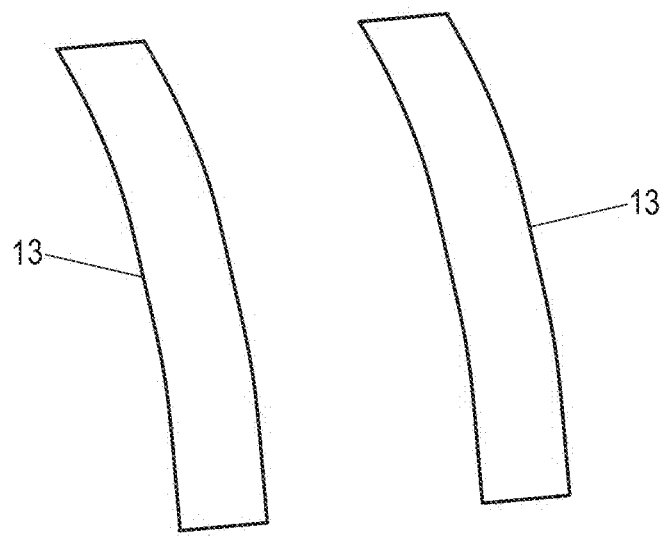
Figure 12:
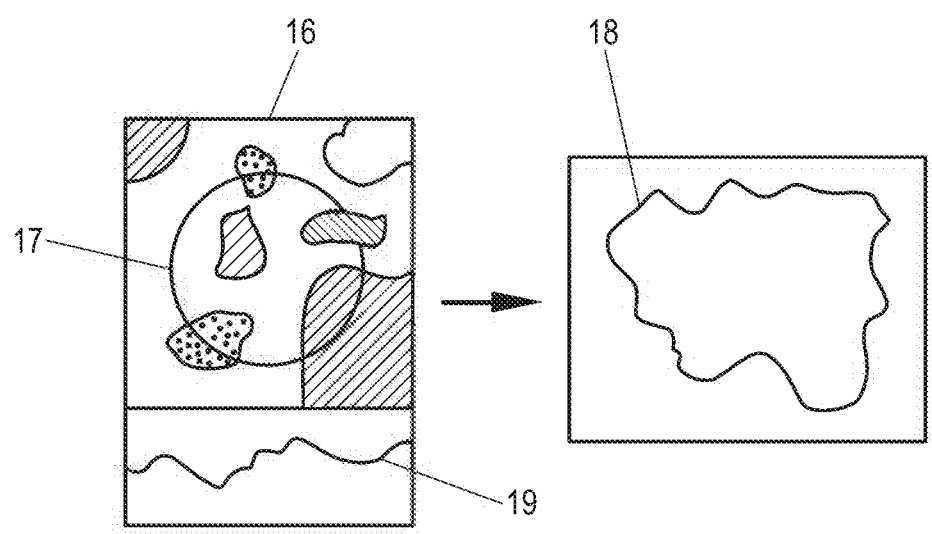
Figure 13:
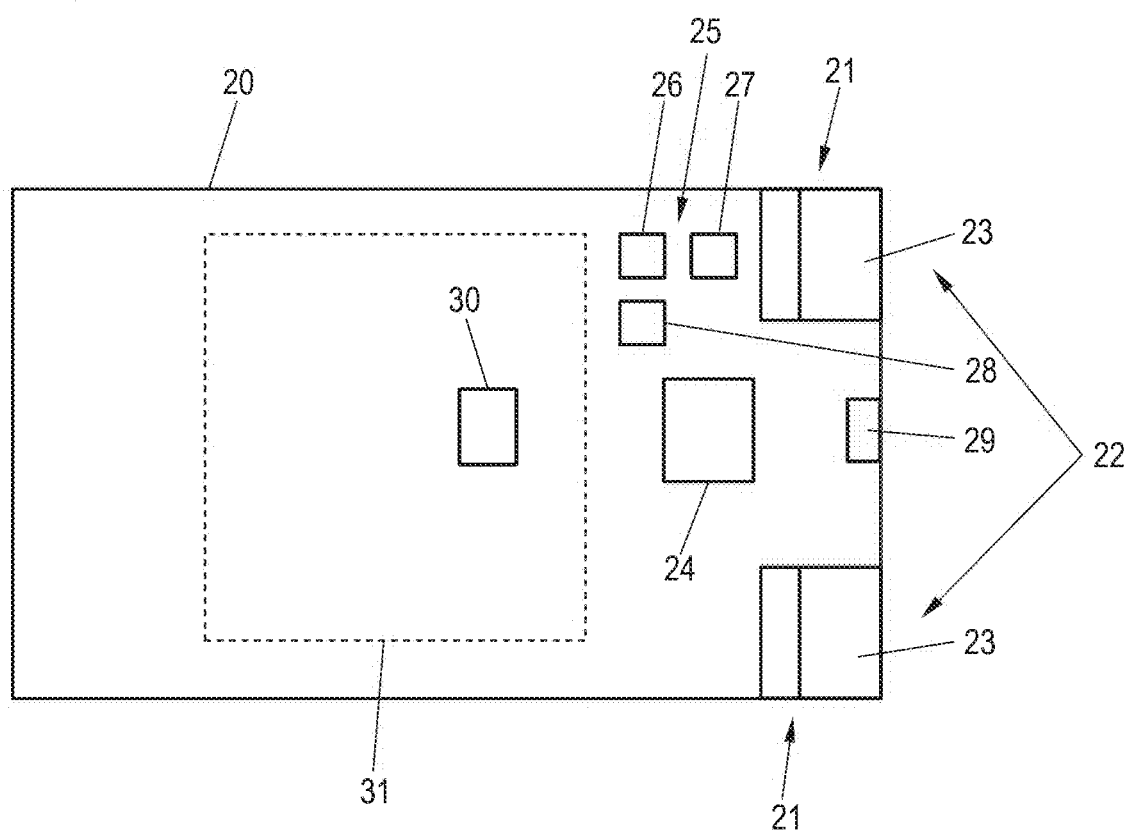

FIG. 5 shows an illustration of a first possible virtual physical interaction with an environmental feature, FIG. 6 shows an illustration of a second possible virtual physical interaction with an environmental feature, FIGS. 7-11 show a morphing operation between two light functions, FIG. 12 shows the derivation of a basic movement of a corner point in the framework of a basic dynamics, and FIG. 13 shows a schematic diagram of a motor vehicle according to the present disclosure.

DETAILED DESCRIPTION

The present disclosure is based on the object of specifying an improved operation of a headlight device with a projection device which can project polygon meshes onto the surface being traveled on.

In order to achieve this object, according to the present disclosure a method and a motor vehicle having the features of the independent claims are provided. Advantageous embodiments result from the subclaims.

In a method of the type mentioned at the outset, it is provided according to the present disclosure that at least one physical property is assigned to at least one polygon feature of the polygon surfaces, in particular at least to the corner points, wherein for dynamic adjustment of the light pattern in a dynamic sub-mode of the polygon operating mode:

time-current operating data of the motor vehicle and/or measurement data of the motor vehicle are recorded, which describe the driving state of the motor vehicle and/or environmental features relevant to the physical property in an environment of the motor vehicle encompassing the projection region, an environment model is provided based on the operating data and/or measurement data, at least for the projection region, and the polygon mesh is adjusted before the light pattern is output on the basis of a computationally determined item of adjustment information that describes a virtual physical interaction of the polygon surfaces with the environment model on the basis of the at least one assigned physical property.

Here a polygon feature can be the entire polygon surface, or at least one edge and/or at least one corner point. According to the present disclosure, a headlight device comprising a projection device and a control unit is assumed. The control unit can control the projection device for projecting a predefined light pattern in a predetermined projection region of the projection device. A polygon operating mode is conceivable here, in which the light pattern comprises a polygon mesh with polygon surfaces defined by projection points as corner points and having polygon edges. The polygon surfaces can be illuminated differently, so that the polygon surfaces can be distinguished from one another by an observer and a special, novel, interesting, and also, as explained below, useful lighting impression is produced. Different types of projection devices, generally known in the prior art, can be used here. In particular, the projection device can comprise an LED matrix, especially micro-LEDs, and/or an optical unit, for example a micromirror arrangement. A wide variety of technologies, such as DMD technologies, DLP technologies, PLM technologies and/or laser scanner technologies can be used.

For example, a headlight device can be used as already described in DE 10 2021 118 839 B3. It can be provided with particular advantage that a distortion correction with regard to the height profile also takes place within the scope of the present disclosure. Therefore, in the control unit, also generally, there can be stored a point map of the projection points, which can also serve as corner points, so that projection points are assigned to the projection region which are located at corresponding projection point coordinates within the projection region. By means of a sensor device of the motor vehicle, a height profile of a surface onto which the light pattern is to be projected can be detected in the projection region. The control unit can be configured to adjust a position of the projection point coordinates according to a predetermined pre-distortion method in dependence on the detected height profile of the surface.

According to the present disclosure, it is now proposed to achieve a lively, dynamic representation of the light pattern by dynamically adjusting it on short time scales, which ideally correspond to the control clock cycle of the projection device. Therefore, this means that an adjustment of the light pattern, in particular starting from the light pattern of a preceding time step, preferably takes place for each time step in which the output is clocked by means of the projection device. This means that a constantly changing, lively, and dynamic polygon mesh can be created in the light pattern. A procedurally generated, dynamic representation is used, which is created at runtime and adjusted in each time step, i.e. it does not correspond to a predefined video. Generally speaking, the adjustment also takes place in the already mentioned control unit.

The basis of the adjustment is the idea that polygon features of the polygon surfaces virtually physically interact with environment features described in an environment model. For this purpose, specifically, at least one physical property is assigned to at least one polygon feature of the polygon surfaces, for example at least one corner point and/or at least one edge and/or the polygon surface as a whole. If there is now a description of environmental features in an environment of the motor vehicle encompassing the projection region, a virtual physical interaction of the polygon surfaces, more precisely their features provided with physical properties, with the environment model can be calculated, for example in the manner of a simulation and/or according to a physics engine, as is known for example from computer games. This way, not only a unique appearance and behavior of the polygon mesh is generated, but also an organic representation for a viewer is achieved. The polygon mesh reacts, so to speak, to circumstances and objects in the environment. The term "environmental feature" is to be understood broadly and can, for example, refer to environmental objects, but also to environmental conditions such as temperature, wind speeds and the like. Since the polygon surfaces are understood to move with the vehicle, so to speak, and since the projection device also moves with the motor vehicle, environmental features, specifically environmental conditions, can also be caused by the vehicle itself, for example a certain airstream, or forces that occur when driving through a curve. It is therefore proposed to use, in corresponding embodiments, time-current operating data of the motor vehicle, for example a velocity and/or a current trajectory of the motor vehicle and/or angular velocities and/or angular accelerations of the motor vehicle and/or accelerations of the motor vehicle. Information relating to environmental features outside the motor vehicle can be derived from measurement data recorded, for example, with sensor devices of the motor vehicle; however, it should be noted that the measurement data do not necessarily have to originate from the motor vehicle itself, but can also be received via a communication device of the motor vehicle and can be available there. This relates, for example, to information about weather conditions and the like, which can be retrieved from the Internet and/or from another backend server, for example. It is clear that a variety of information sources can be used to determine the environmental features relevant to the virtual physical interaction and the at least one physical property and to describe them in the environment model.

In specific embodiments, it can for example be provided that the virtual interaction is described by at least one mathematical relation in which the operating data and/or the measurement data and/or the model parameters of the environment model derived therefrom are included. If the operating data and/or the measurement data are included directly in the mathematical relation, the operating data and/or the measurement data form model parameters of the environment model; of course, it is however also possible to at least partially determine the specific model parameters of the environment model, which further comprises the mathematical relation, from the operating data and/or the measurement data. For example, the mathematical relation here can include at least one basic physical relation, such as a law of physical interaction for describing the virtual physical interaction. For example, the mathematical relation, discussed in more detail below, can describe a interaction force that acts on the corresponding polygon feature, and the like. However, more complex virtual physical interactions are also conceivable, for example the formation of polygon surfaces or polygon features as sensors for location-based features and a corresponding reaction to this.

Depending on the desired virtual physical interaction, for which examples are described in more detail below, corresponding physical properties can be selected, and different physical properties can of course also be assigned to different polygon features. The at least one physical property assigned to the at least one can, for example, be selected from the group comprising a mass, a velocity, a friction value, an elasticity value, a strength, and at least one electromagnetic property. In addition or alternatively, physical properties can also describe predetermined boundary conditions for at least some of the polygon features, for example immobility of a polygon feature and the like.

To determine the adjustment information, at least one simulation can preferably be carried out, in particular by a physics engine, as already described. Alternatively or additionally, at least one solution algorithm can be used for an initial value problem. Simulations for imaging virtual physical interactions are generally already known in the prior art. For example, a finite element simulation and/or a particle simulation can be used as a simulation. For example, an explicit Euler method can be used as a solution algorithm to solve an initial value problem.

Therefore, for the implementation of virtual physical interaction with environmental features, it can be provided that polygon features of the polygon surfaces, for example the corner points and/or the polygon surfaces as a whole, are assigned physical properties. These properties can be, for example, mass and/or weight and/or friction and/or velocity and/or strength and/or electromagnetic properties. The environment model can depict effects such as gravity, suspension, electromagnetic interactions and the like, so that realistic physical movements and behavior can be simulated, as is known from physics engines in games or simulations, for example. Particularly preferably, taking into account the environmental features and the polygon features provided with at least one physical property, a particle system can result in which the virtual physical interaction can be calculated by means of a particle simulation; methods for solving initial value problems, such as the explicit Euler method, can also be used.

At this point, it should be pointed out that the light pattern of the projection device is used alone, but it is also conceivable that the polygon mesh overlays other light effects, such as wide-area illumination. Furthermore, it should be noted that the organic, lively and dynamic behavior of the polygon mesh generated in the method according to the present disclosure can be specifically described by adjustment parameters, which can also be selectable by a user. For example, it is conceivable that a user, e.g. a driver of the motor vehicle, could set various adjustment parameters for dynamic adjustment using a human-machine interface. For example, certain desired virtual physical interactions can be selected, their strength parameterized, and the like.

In general, it can be said that the dynamic adjustment of the polygon mesh preferably describes a smooth movement without jumps or the like, for example a continuous change, so that it is pleasant to look at and has little potential for distraction.

In the following, specific advantageous embodiments of the dynamic adjustment of the polygon mesh during runtime, provided according to the present disclosure, are proposed.

A particularly useful further development of the present disclosure provides that the virtual physical interaction relates to an object in the environment, in particular a pedestrian, described by the measurement data recorded in particular by a sensor device of the motor vehicle. In this case, at least one of the at least one environmental features is thus an object. If, as will be assumed in the following, the projection device is also designed for contact-analog display with respect to such objects, virtual physical interactions with such objects can be displayed particularly well. Here the object can be in particular a pedestrian, who can therefore be pointed out by the virtual physical interaction and the resulting dynamic adjustment of the display, which increases safety. On the other hand, the pedestrian will also notice that they have been detected by the motor vehicle sensor system after the polygon mesh has visibly reacted to them.

In a specific, advantageous embodiment, it can be provided that the virtual physical interaction comprises an attractive force and/or repulsive force between the object and at least one of the polygon features to which a physical property is assigned. In this way, the object can be swarmed, so to speak, in that polygon features, in particular corner points, are so to speak "magnetically" attracted by the object, for example a pedestrian. Alternatively (or additionally for some corner points), it is also conceivable for corner points or polygons to be "magnetically" repelled by the object. For example, the speed of movement of corner points can increase the closer they are to the object, e.g. a pedestrian. It is also possible for polygon features, e.g. corner points and/or edges that contact the object, to remain "stuck" to it, so to speak. They are therefore carried along when there is further movement of the object.

Particularly with regard to a virtual force of attraction between the polygon feature and the object, it can also be useful to select at least one interaction parameter of the virtual physical interaction, i.e. an adjustment parameter, to bring about a circulating movement. Such a circulating movement can also be superimposed on approaching movements, so that, for example, a kind of "falling spiral" can occur.

Of course, further advantageously usable specific realizations of the attractive force and/or repulsive force are also conceivable as virtual physical interactions. For example, an attraction and/or repulsion force profile as a function of distance can also be provided, so that, for example, a kind of "bouncing" of the polygon features against the object, for example a pedestrian, can take place if at greater distances an attraction force arises which changes into a possibly stronger repulsion force at short distances. It is also conceivable to provide different types of interaction for different polygon features of a single polygon surface, for example to attract some corner points and/or edges and repel others or keep them in a fixed position, which can cause a distortion effect. In other conceivable specific embodiments, it is conceivable for polygon surfaces to be attracted to the object and disappear into it, wherein new polygons can be added to the mesh for example from the edge of the light pattern. The reverse is also possible, for example the creation of new polygon surfaces to be repelled, from or on the object.

It is also possible in an expedient further development that the virtual physical interaction describes a virtual energy input and/or energy extraction, which is represented by brightening or darkening the projection brightness of the polygon surfaces and/or increasing or slowing down the speed of movement of the at least one polygon feature, in particular a corner point. It is possible, for example, to adjust the brightness of the polygon surfaces around an object, such as a pedestrian, for example to increase the brightness in order to highlight the object. For example, an outstanding highlighting of an object, such as a pedestrian, can be achieved in the dynamic adjustment of the polygon mesh by illuminating the polygon surfaces around the object more brightly than polygon surfaces further away, and/or by making the speed of movement of the corner points of the polygon surfaces faster the closer the corner point is to the object. As already mentioned, the corresponding adjustment parameters, in this case interaction parameters, can be parameterizable, for example the strength of an energy extraction or energy input (difference in brightness) and/or the range of the interaction (radius).

As already mentioned, the virtual physical interaction can also relate to an adhesion of at least one of the corner points to the object, so that the corresponding polygon features are "pulled along" when the object is moved.

In a particularly advantageous development of the present disclosure, it can be provided that at least one interaction event of the virtual physical interaction, in particular a contact between at least one of the polygon features and the object, is assigned an item of acoustic output information which is output when the interaction event occurs by means of an acoustic output means acting outside the motor vehicle and/or by means of an acoustic output means acting on an interior of the motor vehicle. A combination with an external sound of the motor vehicle is thus conceivable in an interaction with an object; for example, at least one sound can be emitted when contacting and/or influencing a polygon feature. In this context, it is particularly advantageous if the output means for outputting the output information outwardly from the motor vehicle is designed in such a way that this information appears to emanate from the location of the interaction event and/or of the object. A 3D sound function can therefore be used to make the acoustic output appear at the location of the object. Of course, stereo output means and the like are also conceivable. In addition or alternatively, it is also conceivable to combine the interior sound of the motor vehicle, for example to also acoustically indicate a direction to the object, e.g. a pedestrian. A direction-dependent acoustic feedback relating to the object can therefore particularly advantageously be provided by means of an output means acting on the interior of the motor vehicle.

In a particularly advantageous embodiment of the present disclosure, it can be provided that at least one of the at least one environmental features describes an environmental state, in particular a weather condition. Weather conditions can relate for example to wind, possibly also wind caused by the movement of the motor vehicle itself (so-called airstream), precipitation, temperature, fog, and the like. Measurement data from vehicle sensor devices can be used here, but of course measurement data supplied by motor vehicle communication devices can also be used, for example through retrieval from the Internet, such as from a weather service. Environmental states caused by the motor vehicle itself can be at least partly derived from the operating data.

Specifically, for example, it can be provided that the environmental condition relates to a wind speed and/or wind direction with respect to a wind generated by the local weather and/or the movement of the motor vehicle, wherein the virtual physical interaction includes an attack of the wind on the polygon features. This means that the physical interaction results in particular in a movement of the polygon surfaces due to the adjustment. The polygon feature can be the entire polygon surface, for example to depict a kind of sail effect, but it is also possible for the polygon feature to be at least one corner point. Then, for example, the wind can dynamically drag corner points along with it and thus illustrate the wind direction outside the motor vehicle. It is possible, for example, to hold fixed a portion of the corner points of polygon surfaces while the wind pulls on the at least one remaining corner point, resulting in a movement that can, for example, depict fluttering in the wind. In other embodiments, it is also conceivable for polygons to actually fly through the projection region.

A further specific embodiment of the present disclosure can provide that the ambient state relates to precipitation, wherein impact locations of the precipitate in the projection region are determined from the measurement data and, when precipitation strikes a polygon surface, the projection brightness of this surface is adjusted for a predetermined period of time. The virtual physical interaction then represents a detection of the impact, where the detection of the impact can be represented, for example, by an illumination and/or darkening of the polygon surface. In this way precipitation can be visualized, wherein for example in the case of rain polygon surfaces that a drop strikes, it can easily be illuminated.

In this context, an expedient further development can provide that, when wind and/or precipitation are used as environmental states, interior output means are additionally controlled inside the motor vehicle in order to reproduce the corresponding environmental features acoustically and/or optically and/or haptically. In this way, for example, the outside world can also be reflected in the interior to remind the occupants in the heated, dry, cozy interior of the less comfortable weather outside the motor vehicle. In this way, an immersive experience can be created.

Particularly with regard to ambient states relating to precipitation, it can also be provided that whenever a drop, a flake, or the like is detected, this interaction event of the virtual physical interaction is accompanied by an item of acoustic output information, for example a sound, by means of a or the acoustic output means acting outside the motor vehicle and/or by means of a or the acoustic output means acting on an interior of the motor vehicle. In this way, for example precipitation is also made audible, in particular inside the motor vehicle, in order to improve the above-described immersive experience.

In a further specific embodiment, at least one of the at least one environmental features can be a ground and/or air temperature, wherein, in particular starting from the exceeding of a limit value for the ground and/or air temperature, at least some of the polygon surfaces are displayed in flickering fashion by cyclic brightness variation over multiple time steps, in dependence on the ground and/or air temperature. In this case, the virtual physical interaction is a heat flicker that reproduces the flickering of hot air. For example, the polygon surfaces can flicker on hot asphalt/surfaces. In this way, it is also possible to visually depict the outside world in the interior, for example to remind the occupants in the air-conditioned, cozy interior of the heat outside. An immersive experience is provided.

In a particularly advantageous development of the present disclosure, it can be provided that the item of adjustment information is determined additionally taking into account at least one additional item of information of a vehicle function. In this way, the dynamic adjustment also makes it possible to reproduce additional item of information from vehicle systems by means of the polygon mesh, providing a further, particularly advantageous benefit of the headlight device. It should also be noted here that the configuration of carrying out a dynamic adjustment, in particular proceeding per time step, on the basis of an additional function provided by a vehicle function can also be useful on its own, i.e. independently of the adjustment based on a virtual physical interaction. In this case, the polygon mesh is therefore not adjusted in addition to, but rather without, virtual physical interaction, before the light pattern is output on the basis of the additional item of information.

In a specific embodiment, it can be provided that the additional item of information is a lane departure warning of a driver assistance system with an associated departure side, wherein the polygon surface on the departure side are displayed flashing over multiple time steps through cyclic brightness variation in order to output the lane departure warning. Consequently, a lane departure warning can be integrated into the light carpet with polygon texture described according to the present disclosure, i.e. the polygon mesh, by modifying the polygon surfaces on the corresponding side when leaving the current lane, for example by making them brighter or even flashing to provide an even better indication. Similar options for the outputting of warnings by vehicle systems, in particular warnings relating to direction and/or position, can be localized in an analogous manner, in particular with regard to contact, by means of an adjustment of the polygon mesh.

In a particularly preferred development of the present disclosure, it can be provided that the additional item of information describes a transition from a current illumination region of the light pattern in the projection region to a new illumination region of the light pattern in the projection region, which transition is desired by a vehicle function, in particular one which at least partially specifies the light pattern, the transition taking place over a plurality of time steps by a movement and/or an addition and/or a removal of polygon surfaces to form the new illumination region, which formation is described by a sequence of items of adjustment information. This function can be referred to as "morphing," i.e. a transition between images, in this case light patterns, in which the shape adjusts smoothly to the target display, in this case the target illumination region. Specifically, the transition can describe a change from one light function to another light function. The light pattern, specifically the polygon mesh, can then effectively morph back and forth between light functions. This creates a particularly striking overall presentation that illustrates the change in an elegant and pleasing way.

In particular, here it can also be provided that when changing from one light function to another light function, the one and/or the other light function is carried out without using the polygon operating mode, the polygon operating mode being activated at the start of the transition or deactivated at the end of the transition. If, for example, the headlight device, in particular the projection device, is initially only used to represent a continuous light carpet in the corresponding illuminated region of the light function, the light carpet can initially be converted into the polygon mesh with the polygon surfaces when the light function is changed, after which the fluid and dynamic transition described by the adjustment information to the other light function takes place, for which the polygon operating mode can then be deactivated again and a light carpet can result.

Thus, the polygon mesh is used in this embodiment for displaying the transition. Here, when activation takes place at the start of the transition the definition of a start configuration of the polygon mesh is restricted by the boundaries of the current illumination region.

Generally speaking, the sequence according to the sequence information can be determined by a suitable determination algorithm that uses the illumination regions as input data. Here, for example, it can specifically be provided that when the illumination region is enlarged by the transition, new polygon surfaces are displayed as approaching and supplementing the current illumination region to form the new illumination region. This can be particularly useful, for example, when switching on a cornering light, a lane change light, and/or a navigation light.

If the illumination region is at least partially divided, it can be provided that in order to form the new illumination region, polygon surfaces are displayed moving apart from another, starting from a common edge in a division region, which surfaces are combined to form the desired portions of the illumination region after the division. In this case, the transition can relate, for example, to a change from a lane lighting to a construction site light. A construction site light can for example project two lines in front of the motor vehicle which display the width of the motor vehicle on the roadway and thus help to maneuver safely through bottlenecks, for example at construction sites.

If, in a specific example, a transition is to be made from a lane light with polygon mesh to a construction site light, the light carpet can divide in the middle and the individual regions can morph into the construction site light. In another concrete example, if a lane light without a polygon mesh is to mutate into a construction site light, the light carpet can first be given a polygon texture, i.e. described by a polygon mesh. The light carpet, i.e. the polygon mesh, can then be divided into individual polygons that move to the position of the construction site light. The polygons then combine to form the construction site light with the polygon texture, and the polygon mesh can then disappear again.

In an advantageous development of the present disclosure, it can be provided that the vehicle function is a driving function for fully automatic driving of the motor vehicle. This means that the polygon mesh and its continuous adjustment can also be used to provide feedback regarding the automated driving to occupants of the motor vehicle and/or other road users. For example, certain arrangement patterns and/or movement patterns and/or symbols formed by the polygon mesh can be used as additional item of information to display various states or items of operating information of the driving function for fully automatic driving of the motor vehicle. The additional item of information can, for example, relate to a currently planned driving maneuver and/or currently detected objects in the surroundings, which are displayed by adjusting the light pattern. For example, a future planned trajectory of the motor vehicle can be imaged by darkening and/or brightening the polygon surfaces along this trajectory. It is also possible to display currently recognized objects in the surroundings, wherein in this respect the above statements regarding virtual physical interaction with objects as environmental features can also be used, for example a swarming of detected objects, for example other road users, by the polygons and the like. However, other, for example static, indications of detected objects are also possible, for example arrows formed from polygon surfaces which point to the objects, and the like.

In the context of a driving function for fully automatic driving of the motor vehicle, the additional item of information can also relate to a current operating state of a vehicle system executing the driving function, which is represented by an additional adjustment and/or a modification of the determination of the adjustment information. For example, the taking over of driving responsibility by a vehicle system for fully automatic driving of the vehicle can be indicated, for example by changing the behavior of the polygon surfaces. In particular, it is also possible in this context to adjust interaction parameters of the virtual physical interaction, for example with regard to faster movement, faster lighting and the like, depending on the operating state of the vehicle system performing the driving function.

In a development of the method according to the present disclosure, it can also be provided that the additional item of information relates to a set driving mode of the motor vehicle which is displayed by an additional adjustment and/or a modification of the determination of the adjustment information. For example, it is known in motor vehicles to offer different driving modes tailored to the driver type, in which the motor vehicle reacts differently, for example accelerating faster in a sporty driving mode and making more use of the physical capacities of the motor vehicle. Specifically, it can be provided for example that in a sporty driving mode, compared to a more comfortable driving mode, the dynamics of the adjustment are increased, in particular by a higher speed and/or larger movement distances and/or higher accelerations of the movement of polygon features, in particular polygon surfaces. The driving mode can be selected by the driver, for example as "drive select".

It is also possible within the scope of the present disclosure that the additional item of information describes an acoustic output within the motor vehicle and/or a mood of an occupant. For example, it is conceivable to adjust the dynamic, lively and, in particular, organic reproduction of the polygon mesh to music and/or voice assistants in the motor vehicle and/or to use it as an audio visualizer. For example, the movement of the polygon surfaces resulting from the adjustment can also be adjusted to the driver's moods, which can be recognized by corresponding detection means, for example by slower movements for calmer moods, faster, dancing movements for cheerful moods, and the like. This applies in particular if, as will be explained in more detail below, a basic movement is used which, for example, can be used underneath the physical interaction to ensure the presence of a certain dynamic.

In embodiments of the present disclosure, it can also be generally provided that a lighting function of the motor vehicle specifies an illumination region to be used of the projection region which is smaller than the polygon mesh, wherein a portion of the polygon mesh to be displayed is determined by superimposition with the illumination region to be used and only this portion is projected. A specific, easily implementable possibility for achieving such a texture overlay of illuminated regions is so-called alpha blending. For example, OpenGL offers the option of overlaying illumination regions with a polygon mesh, wherein the operation to be carried out can then correspond to a matrix multiplication.

In a particularly preferred development of the present disclosure, it can be provided that for the initial determination of the polygon mesh of the light pattern
- a point cloud within the projection region describing corner points is generated by a generation function,
- the polygon surfaces are defined by a connecting function of the corner points, and
- projection brightnesses can be assigned to the polygon surfaces by an assignment function.

A particularly balanced, uniform, so to speak "soft" generation is particularly useful if an equally soft adjustment that makes do without excessive contrasts or jumps is to be made later as part of the virtual physical interaction and/or basic dynamics.

For example, to generate a point cloud that is as evenly distributed as possible within the projection region, for example also in an illumination region as a sub-region of the projection region, it can be provided that the generation algorithm comprises a Poisson disk sampling, in particular a Bridson algorithm. Compared to other sampling methods, Poisson disk sampling provides a significantly more uniform point distribution in the point cloud. In particular, the use of a Bridson algorithm is suitable here. Alternative methods applicable within the scope of the present disclosure include Mitchell's Best Candidate algorithms and/or uniform random sampling. In all these cases, a random generation of a spatially uniformly distributed point set, namely the point cloud, is carried out.

In this point cloud, triangles, for example, can be defined as polygon surfaces. A large number of methods are already known for defining triangles in a well-formed way without overlapping on a point cloud. Well-formed triangles can be understood here as those in which the minimum angles of the triangles are maximized. Expediently, it can thus be provided that triangles without overlap with maximization of the minimum angles of the triangles are defined as polygon surfaces, in particular by means of Delaunay triangulation. Alternatively, a Graham's scan algorithm can be used to find a convex hull in order to then define inside the triangles using further sub-steps of the connection algorithm.

As regards the shading of the polygon surfaces, i.e. the selection of the projection brightness values, it is particularly advantageous if these are assigned on the basis of an at least two-dimensional first gradient noise. This creates gradual transitions in the shading of neighboring polygon surfaces to avoid jumps in brightness. This creates an ideal starting point for an organic, dynamic character of the polygon mesh. In this case, the resulting shading is comparable to that of clouds, thereby creating a further natural, organic reference point for the observer.

Here an at least two-dimensional first gradient noise is generated, so that an at least two-dimensional noise domain (definition region of the noise function describing the first gradient noise in the n-dimensional noise space) therefore also exists which covers the projection region or at least the illumination region in which the polygon mesh is to be created. The first gradient noise can be generated using a simplex noise method, for example, although a Perlin noise method and/or a wavelet noise method can also be used as an alternative. In particular, a boundary condition limiting differences in noise between neighboring sampling points can be used here. Such a boundary condition can additionally prevent excessive jumps. Therefore, an important additional output of the at least two-dimensional first gradient noise is that jumps in brightness are avoided during its generation. To determine the projection brightnesses from the at least two-dimensional first gradient noise, in particular the at least two-dimensional first noise domain, it is possible, for example, to select the noise value at the location of the centroid of the respective polygon surface; however, other procedures are also possible, such as averaging noise values over the respective polygon surfaces and the like.

In a particularly expedient development of the present disclosure, it can be provided in this context that the first gradient noise is determined three-dimensionally, wherein the third dimension describes a temporal development of the projection brightness values for use in the adjustment as a variable basis under virtual physical interaction or when virtual physical interaction is not present. This means that an adjustment of the projection brightnesses without physical interaction is also conceivable in order to provide a lively, dynamic, and interesting light pattern, which can always be useful in terms of time and space if there is no or only a very small virtual physical interaction, for example due to a distant and/or otherwise non-influencing environmental feature, or one that is not detected. Specifically for the projection brightnesses, a temporal change can thus be retrieved in a three-dimensional first noise domain in the direction that is not used to determine the start projection brightnesses.

However, it can also generally be expedient to add certain basic dynamics to supplement the virtual physical interaction. Thus, a particularly advantageous embodiment of the present disclosure provides that the item of adjustment information is adjusted additionally taking into account a randomized and/or physically based virtual basic dynamic which is superimposed on the virtual physical interaction. An example of such basic dynamics in relation to the projection brightnesses is the three-dimensional generation of the first gradient noise already discussed, in order to achieve a pleasant and continuous change in the shading of the polygon surfaces with as few jumps as possible.

It can also generally be provided that the basic dynamics are determined as a soft, continuous dynamics, in particular using boundary conditions that delimit and/or avoid jumps. In particular, it is conceivable, comparable to the already described adjustment of interaction parameters of the virtual physical interaction in dependence on additional information and/or the further adjustment of the polygon mesh in dependence on at least one piece of additional item of information, that at least one basic parameter describing the basic dynamics is adjusted in dependence on the additional item of information. This means that the basic dynamics, in particular a basic movement, can also be adjusted to the current overall situation using additional item of information, for example with regard to the driver's mood, a selected driving mode, a current operating state of a vehicle system for executing a vehicle function for fully automatic driving of the motor vehicle, and the like.

The basic dynamics, in particular a basic movement of the basic dynamics, can also be virtually modeled on physical conditions. For example, it is possible for the basic dynamics to be at least partially modeled on a Brownian motion.

However, it can also be advantageous if, as already explained, the virtual basic dynamics are at least partially randomized, i.e. generated by a random principle. Randomization, i.e. chance-based generation, has the advantage that a unique appearance and behavior can be created. It should be further noted here that the provision of a randomized and/or physically based virtual basic dynamics can also be advantageous independently of the virtual physical interaction in order to create a lively, dynamic representation. Therefore, instead of the virtual physical interaction, it can also be provided that, for the dynamic adjustment of the light pattern in a dynamic sub-mode of the polygon operating mode, a randomized and/or physically based virtual basic dynamics is determined, wherein the polygon mesh is adjusted on the basis of the calculated basic dynamics before the light pattern is output.

In a specific, particularly advantageous embodiment of the present disclosure, it can be provided that the movement of corner points within the basic dynamics takes place based on a second, two-dimensional gradient noise. The use of a gradient noise for gradually changing the movement of the corner points on a circular path has the advantage that excessive jumps are again avoided and a harmonic, continuous basic movement results. In particular, it can be provided that the movement of movable corner points within the framework of the basic dynamics takes place on a circular path adjusted by the gradient noise. To adjust the circular path, it can be provided that the local noise value of the second gradient noise is added to the radius at the location of the circular path in order to determine the adjusted circular path. Due to the two-dimensional second gradient noise, jumps are also avoided in the gradual change of the circular path in the two-dimensional space. Ultimately, the circular motion is thus applied to the two-dimensional second noise domain by adding the relevant noise value to the radius of the circle. A closed, noisy circular path is created by applying the two-dimensional, second gradient noise.

Here the second gradient noise can also expediently be generated using a simplex noise method and/or a Perlin noise method and/or a wavelet noise method.

In general, in order to achieve a gradual variation, with less jumping, of the shading of the polygon surfaces, it can be provided according to the present disclosure that the projection brightnesses of neighboring polygon surfaces are selected to differ at the edges by at most a transition threshold value that is dependent in particular on one of the projection brightnesses, and/or the projection brightness gradients are low-pass filtered over parts of the light pattern covered by polygon surfaces and/or, during the determining the item of adjustment information, at least one projection brightness of at least one of the polygon surfaces is selected in dependence on the projection brightness of at least one neighboring projection surface. It is thus conceivable, for example, to adjust the shadings to adjacent polygons, which gives the polygon mesh an organic character, similar to clouds. A gradual shading of the individual polygon surfaces can be achieved, in particular a continuous change depending on the location of the polygon surface and time. For example, using the first gradient noise in the third dimension is one way of achieving such an organic-looking, cloud-like representation.

In an expedient further development of the present disclosure, it can be provided that the light pattern, in particular the polygon mesh, is at least partially distorted computationally for a predefined viewer position in such a way that a perspectively correct representation from the viewer position is obtained. While it is fundamentally conceivable to aim for a perspectively correct representation from a viewer position inside the motor vehicle, for example a driver's position, a further development of the present disclosure can also provide for a position outside the motor vehicle to be used at least temporarily as the viewer position, which is the position of a person associated with the motor vehicle outside the motor vehicle and/or the position of an intended recipient of a warning and/or information function communicated by the light pattern, in particular the position of a pedestrian. It is thus possible, generally speaking, to provide distortion for different viewing angles, which can also be integrated, for example, into the pre-distortion method already mentioned. This can also achieve an optimized display for people outside the motor vehicle, for example when a driver returns to the motor vehicle, as the display can then always be optimized for their current position, in particular in the context of the adjustment of the polygon mesh described here.

The present disclosure also relates to a motor vehicle having a headlight device, wherein the headlight device has a projection device and a control unit which is designed to control the projection device for projecting a predetermined light pattern in a predetermined projection region of the projection device, wherein the light pattern in a polygon operating mode of the headlight device comprises a polygon mesh with polygon surfaces having polygon edges defined by projection points as corner points, and the polygon surfaces are at least partially assigned different projection brightnesses, wherein the control unit is also designed to carry out the method according to the present disclosure. All embodiments relating to the method according to the present disclosure can be analogously transferred to the motor vehicle according to the present disclosure, with which the advantages already cited may consequently also be achieved.

Figure 1:
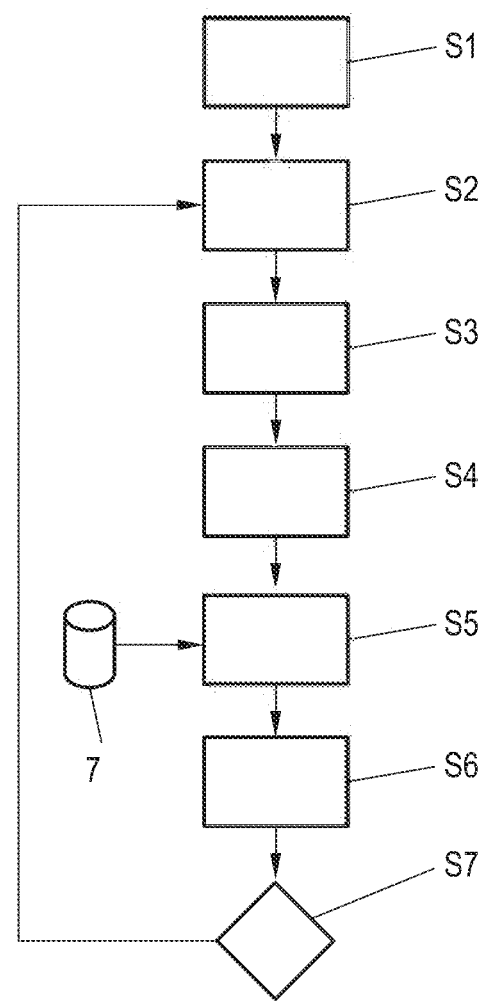
FIG. 1 shows a flow chart of an embodiment of the inventive method.

FIG. 1 is a flow chart of an embodiment of the method according to the present disclosure. This is carried out by a control unit of a headlight device in a motor vehicle, wherein the headlight device also has a projection device. A light pattern, which can be projected into a predetermined projection region of the projection device, can comprise a polygon mesh with polygon surfaces defined by projection points as corner points and having polygon edges, wherein the polygon surfaces are at least partly assigned different projection brightnesses. In the examples shown here, triangles are used as polygons; however, what is presented here can also be applied to other polygons.

The polygon mesh as part of the light pattern or light patterns is output in a polygon operating mode and can be displayed dynamically and in lively fashion in a dynamic submode of the polygon operating mode. It should also be noted at this point that the light pattern can of course also include several polygon meshes if polygons are detached from each other. In particular, polygon meshes formed by individual polygons are also conceivable.

Figure 2:
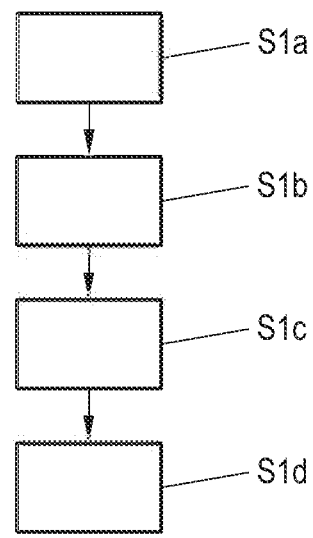
FIG. 2 shows substeps for generating a polygon mesh.

In a step S1, the polygon operating mode is activated with dynamic adjustment of the light pattern, so that a starting configuration for the polygon mesh has to be determined in step S1. In the present case this takes place in a plurality of substeps, as explained in more detail by FIG. 2.

It should be noted in general that in the present case the polygon mesh is determined directly for a current illumination region of the light pattern, which can be a subregion of a maximum conceivable projection region of the projection device, but can also include this entire projection region. The projection region thus indicates the maximum size of a light pattern. There are also conceivable embodiments in which the polygon mesh is generated for the entire projection region, wherein procedures such as alpha blending can be used to cut out the illumination region from the polygon mesh and actually display it.

Figure 3:
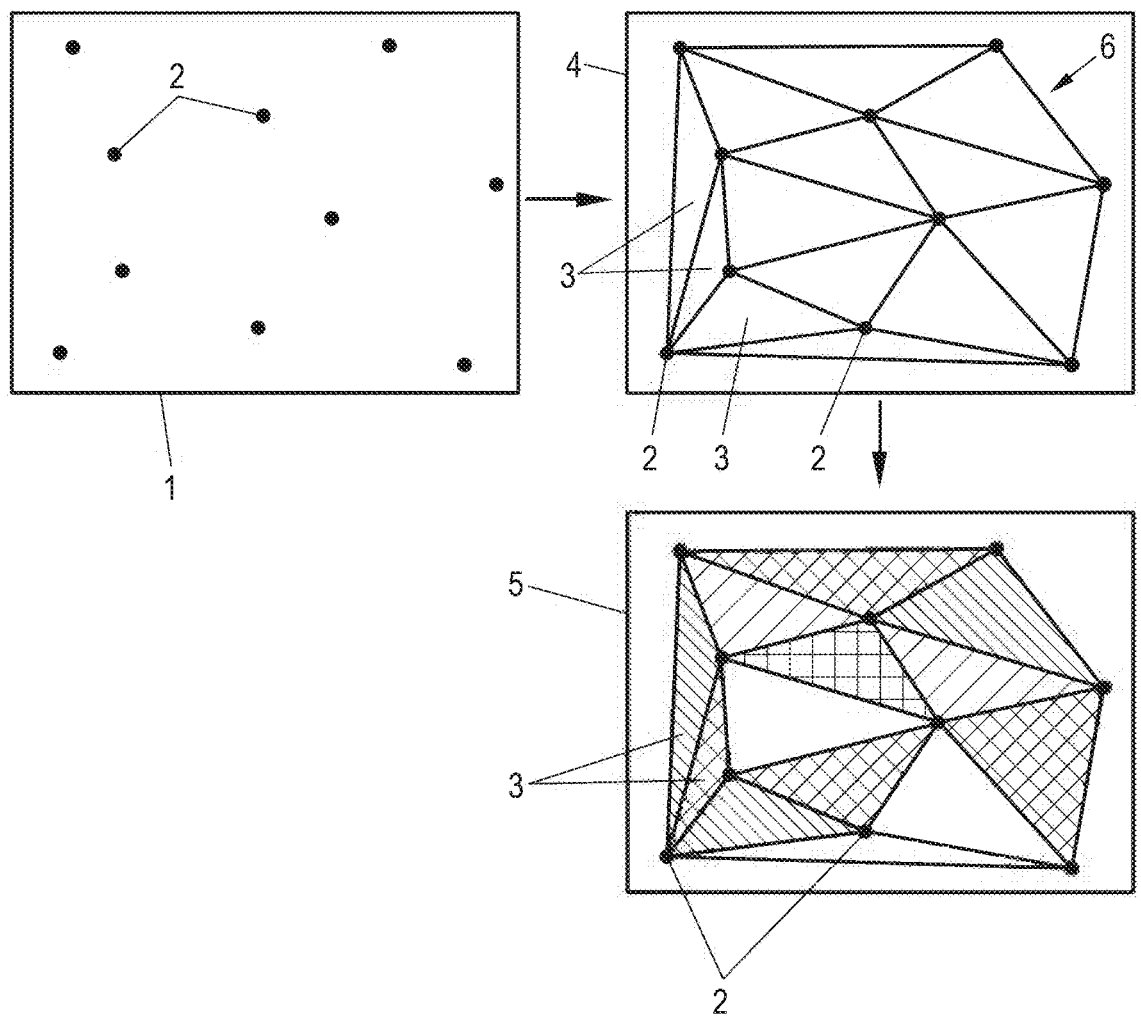
FIG. 3 shows a sketch explaining the substeps of FIG. 2.

In a step S1a, a point cloud of equally distributed future corner points 2 is first generated, as shown in sub-image 1 of FIG. 3, specifically a Poisson disk distribution according to a Bridson algorithm for the random generation of a spatially uniformly distributed set of points. Alternative methods that can be used include Mitchell's Best Candidate algorithms and/or uniform random sampling. The point cloud is generated using a generation function that contains the Bridson algorithm (or a corresponding alternative). In a step S1b, the polygon surfaces 3 are defined by a connection function of the corner points 2, as explained in the sub-image 4 of FIG. 3. Since the polygons are triangles, this process can be referred to as triangulation, wherein in the present case a Delaunay triangulation is used to generate well-formed triangles without overlapping. Well-formed means here that the minimum angles of the triangles are maximized. Graham's Scan can be used as an alternative method within the scope of the connection function.

Figure 4:
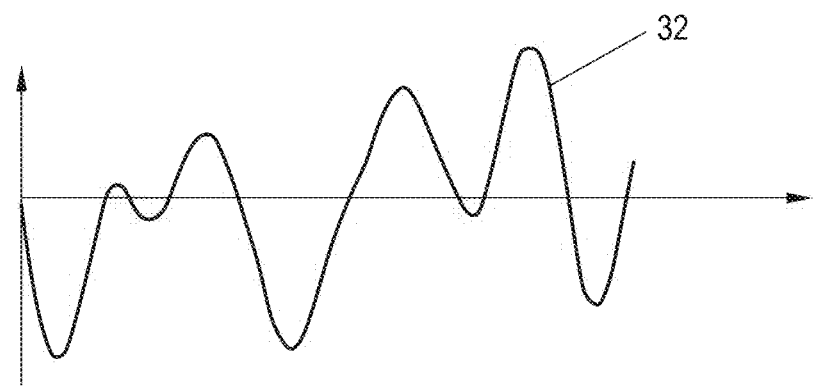
FIG. 4 shows a schematic profile of a gradient noise.

In a step S1c, a mapping function is then used to assign projection brightnesses to the polygon surfaces 3, which are shown as different hatchings in sub-image 5 of FIG. 3. This process can also be called shading. For this purpose, gradual transitions in the shading of neighboring polygon surfaces 3 are to be created already during the generation of the polygon mesh with its projection brightnesses, in order to avoid jumps in brightness, and to achieve shading comparable to clouds. For this purpose, an initial gradient noise, three-dimensional in the present case, is generated using a simplex noise method. Alternative conceivable methods are Perlin noise methods and/or wavelet noise methods. As shown schematically in FIG. 4 for a one-dimensional profile 6, the special feature of the gradient noise is that characteristically no strong jumps occur, compared to white noise.

The result is a three-dimensional noise domain that covers the projection region or at least the illumination region in two of the dimensions. An assignment of projection brightnesses based on the three-dimensional gradient noise takes place in a lowermost two-dimensional layer of the three-dimensional noise domain, for example by selecting the noise value at the centroid or by averaging over polygon surfaces 3.

In addition, starting from this first layer located at the edge of the three-dimensional noise domain, the noise distribution is stored for each subsequent layer in the third dimension and is used at a later point in time to provide basic dynamics in the temporal sense. Projection brightness values for future time steps can already be assigned and stored at this point in time, for example by continuing the centroid into the third dimension; however, it is also conceivable to retain the three-dimensional noise domain of the first gradient noise and then determine the corresponding projection brightnesses according to the current polygon mesh. A three-dimensional noise domain is thus created in order to additionally generate a temporal change in advance, so to speak, which also has a jump-free, organic and lively appearance, since the basis is a gradient noise.

The result of steps S1a-S1c is therefore the polygon mesh 6.

In a step S1d, physical properties are then assigned to particular polygon features of the polygon surfaces 3, which properties are to be used later in various virtual physical interactions. Polygon features here include the polygon surfaces as a whole, but also polygon edges and/or corner points 2, wherein different physical properties can also be assigned to different corner points 2, different polygon edges, or different polygon surfaces 3. The physical properties can include, for example, a mass, a velocity, a friction value, an elasticity value, a strength, at least one electromagnetic property (e.g. a charge), and/or also spring properties.

It should be noted at this point that both the generation of the polygon mesh 6 and the assignment of physical properties can already be influenced by a parameterization by a user, who can for example select how the basic dynamics are to be realized and/or which virtual physical interactions are desired. Automatic adjustment can also take place, in particular throughout the method, for example based on an automatically determined mood of the user, based on a selected driving mode, and the like. Various adjustment options, also with regard to interaction parameters, additional item of information to be used and the like have already been discussed in the previous, more general part of the present description.

Returning to FIG. 1, measurement data and/or operating data of the motor vehicle are now recorded in a step S2, for example via suitable sensor devices of the motor vehicle, on the basis of generally exchanged operating data and/or also by retrieval by means of a communication device of the motor vehicle, for example from the Internet. These operating data and/or measurement data describe environmental features at least in the projection region, wherein both objects and environmental states can be included. Environmental states in the projection region can also arise as a result of the operation of the motor vehicle, for example where the airstream is concerned.

In step S3, these environments and/or operating data are used to provide an environment model at least for the projection region such that, based on the assigned physical properties, a virtual physical interaction of the polygon surfaces 3 with the environment model, specifically the environment features described therein, can be computationally determined. In simple cases, at least some of the intended virtual physical interactions can be described by mathematical relationships, but more complex environment models are also possible which can be used as the basis of a simulation for calculation, particularly in the context of a physics engine, as explained in more detail below.

After the provision of the environment model in step S3, or preferably in parallel with this, in step S4 virtual basic dynamics which is to be superimposed on the virtual physical interaction can also be determined. The basic dynamics are determined as soft, continuous dynamics and can be modeled on a Brownian motion or other basic physical principles, but can also be randomized, in which case a second, two-dimensional gradient noise is preferably used, as explained in more detail below.

In a step S5, an item of adjustment information is then determined in order to adjust the polygon mesh before the light pattern is output. Of course, the virtual physical interaction of the polygon surfaces 3 with the environment model is included in the adjustment information, in particular superimposed with the described basic dynamics, which with regard to the shading can otherwise be based on the first gradient noise in the third dimension, as already also explained for step S1c. In addition, however, at least one additional item of information 7 is also included in the adjustment information, which additional information can be realized in many ways in order to further realize the dynamic adjustment, wherein in particular reference is also made to the realizations described in the above description. The additional item of information is provided by at least one vehicle function and can relate, for example, to an item of information to be output by this function, for example a lane departure warning. The additional item of information can also describe a change from a light function to another, wherein a continuous, dynamic transition is then created which is described by a sequence of items of adjustment information which accordingly go in the corresponding time steps in step S5. A vehicle function that provides additional item of information 7 can also be a driving function for fully automatic driving of the motor vehicle, where, for example, planned driving maneuvers, recognized objects and current operating states of the vehicle system executing this driving function are incorporated into the dynamic adjustment or the determination of the adjustment information (by parameterization). With regard to such a modification of the determination of the adjustment information, an item of additional item of information 7 relating to an adjusted driving mode of the motor vehicle should be mentioned in particular, wherein the dynamics of the adjustment can be increased in a sporty driving mode compared to a more comfortable driving mode, for example also with regard to the basic dynamics, which can be accelerated.

The adjustment information determined overall in step S5 is then used, as mentioned, to adjust the polygon mesh, according to which the light pattern is output with the adjusted polygon mesh 6 in step S6 by means of the projection device. It should be noted at this point that all previously described steps are carried out by the control unit of the headlight device. This ultimately also applies to step S7, in which it is checked whether the polygon operating mode is to be terminated or to continue to be maintained. If the latter is the case, the method continues in the next time step with step S2, so that a continuous adjustment of the polygon mesh is actually carried out in order to create an immersive, organic experience. In this case, the update frequency determining the time steps can for example be greater than 50 Hz, in particular greater than 100 Hz.

FIG. 5 shows a first example of a possible virtual physical interaction, in this case with an object 8. The object 8 can, for example, be a pedestrian 9 which is detected via a sensor device of the motor vehicle. In the present case, the virtual physical interaction comprises a magnetic attractive force on at least a portion of the corner points 2 of the polygon surfaces 3 of the polygon mesh 6, as indicated by the arrows 10. Here repelling forces are also conceivable; in particular, a force profile which becomes repulsive closer to the object 9, so that a type of "bounce effect" on the object 8 is created. Other types of virtual physical interactions with objects 8 are of course also conceivable, for example energy input/energy withdrawal, which causes lighter or darker projection brightnesses of the polygon surfaces 3, and the like.

FIG. 6 explains, by way of example, a virtual physical interaction with an environmental state, here a weather condition, as an environmental feature, in the present case precipitation, which is shown by drops 11 detectable by means of a sensor device of the motor vehicle. The polygon surfaces 3 act here as drop detectors, in that they light up briefly with a higher projection brightness when a drop falls on them. Other environmental conditions can include for example wind, possibly also including an airstream to which the polygon surfaces 3 moved along with the motor vehicle can be virtually exposed, temperatures, and the like. For example, points 2 can be distorted by the wind and/or polygon surfaces 3 can flicker, reflecting the heat.

Figure 7:
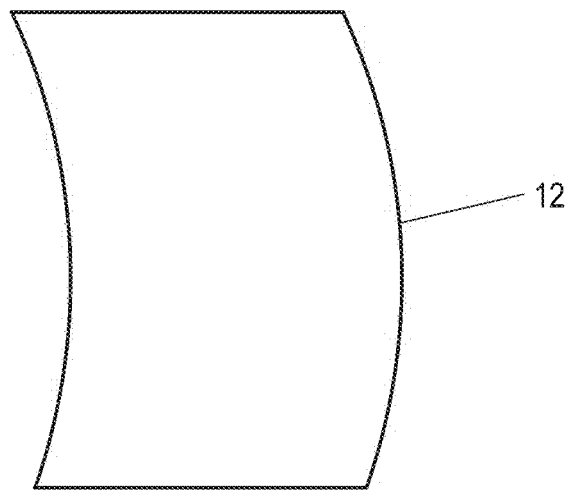
Figure 8:
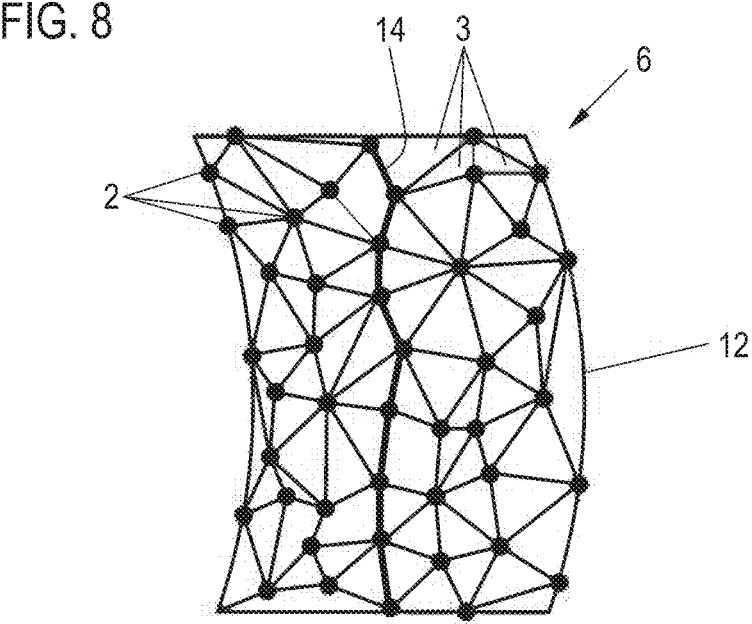
Figure 9:
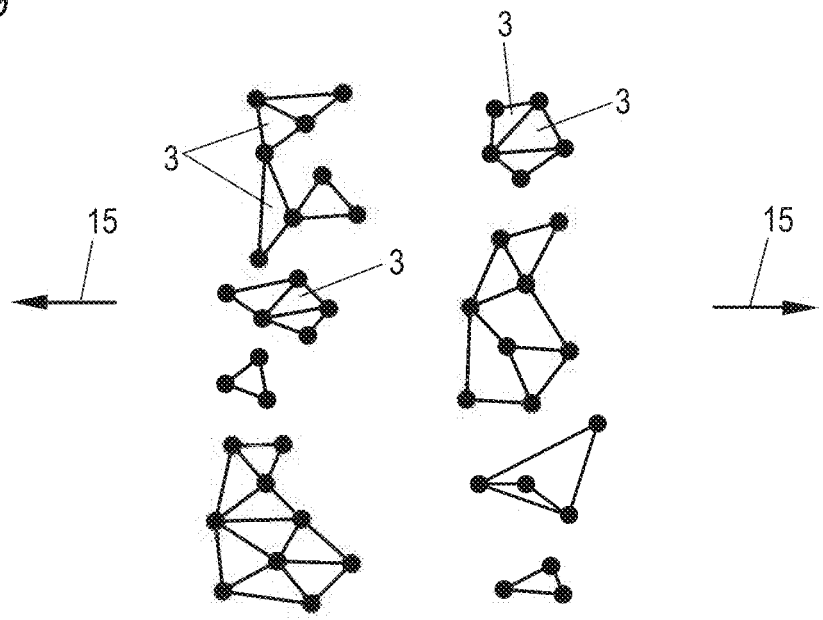

FIGS. 7 to 11 illustrate a transition from one light function to another light function using a sequence of items of adjustment information. Here, an illumination region 12 of a lane light is assumed as shown in FIG. 7, wherein the polygon operating mode is not active. The light pattern is thus here a continuous light carpet that is formed according to a currently traveled lane of the motor vehicle. This is now to be switched over to a construction site light, which in turn is to work without the polygon operating mode, and is to include two light carpets on the left and right indicating the width of the motor vehicle as a new illumination region 13, as shown in FIG. 11. In order to realize the transition between these light functions, the polygon operating mode is first activated in the illuminated region 12 and a polygon mesh 6 is added. The definition of the starting configuration of the polygon mesh 6, which can be determined for example according to steps S1a to S1d, is delimited by the boundaries of the current illumination region 12.

To form the new illumination region 13, polygon surfaces 3 are shown moving apart from one another from a common edge 14 (see FIG. 9, arrows 15), which combine to form the portions of the illumination region 13 desired after the division (see FIG. 10). The polygon operating mode can then be deactivated again.

FIG. 12 explains a possibility for determining a basic movement of corner points 2 of the polygon surfaces 3 within the scope of the basic dynamics. Here a second two-dimensional gradient noise is generated, for example again using a simplex noise method, whose noise domain 16 is shown on the left in FIG. 12. Superimposed on this is a circle 17, which is to be converted into a randomized, closed movement path 18 (see right-hand sub-image). For this purpose, the lower portion of the left-hand sub-image of FIG. 12 first shows the profile 19 of the second gradient noise along the circle 17. To generate the adjusted circular path 18, the local noise value is added to the radius at each point according to the course 19 at the location of the circular path 17. Due to the use of the second gradient noise, no jumps occur here, so that a closed movement path results as adjusted circular path 18.

It should be noted that in order to generate a larger number of configurations in the polygon mesh 6 different radii of the initial circular path 17 can also be selected for different corner points 2.

Finally, FIG. 13 shows a schematic diagram of a motor vehicle 20 according to the present disclosure. The motor vehicle 20 comprises a headlight device 21 with a projection device 22 which is formed by a right and a left projection unit 23. The operation of the headlight device 21 is controlled by a control unit 24, for example a control device of the motor vehicle 20.

In this case, the control unit 24 is designed to carry out the method according to the present disclosure, for example in the embodiment described according to FIG. 1, and can have corresponding functional units. In order to be able to record the measurement data and the operating data, corresponding recording means 25 are provided, for example a sensor device 26 with various sensors that are directed at the motor vehicle's surrounding environment, a communication device 27, via which information can also be retrieved in particular from the Internet and/or from other road users (c2x). The control unit 24 can receive additional item of information from other vehicle systems 28.

Since in embodiments of the method according to the present disclosure it can also be provided to accompany various effects, in particular interaction events of the virtual physical interaction, with an acoustic output, the motor vehicle 20 can in addition comprise an acoustic output means 29 that acts on the exterior, in exactly the same manner as an acoustic output means 30 in an interior 31 of the motor vehicle 20. The acoustic output means 29 for the exterior is designed in particular to generate noises such that they originate from a point in the surrounding environment, in particular in the projection region. For example, in the embodiment according to FIG. 6 a sound can be output whenever one of the polygon surfaces 3 lights up briefly.

The invention claimed is:

1. A method for operating a headlight device of a motor vehicle, the method being using a control unit of the headlight device, the method comprising:

projecting a light pattern in a projection region of a projection device, wherein the light pattern is initially predetermined and the projection region is predetermined, and wherein the light pattern in a polygon operating mode of the headlight device comprises:
a polygon mesh with polygon surfaces having polygon edges defined by projection points as corner points, wherein the polygon surfaces are at least partially assigned different projection brightnesses, and wherein at least one physical property is assigned to at least one polygon feature of the polygon surfaces;
recording operating data of the motor vehicle and/or measurement data of the motor vehicle, which describe a current driving state of the motor vehicle and/or current environmental features relevant to the at least one physical property in an environment of the motor vehicle encompassing the predetermined projection region;
determining, by the control unit, an environment model based on the operating data and/or measurement data, at least for the projection region; and
adjusting the polygon mesh before outputting the light pattern, the adjusting being based on a computationally determined item of adjustment information that describes a virtual physical interaction of the polygon surfaces with the environment model on the basis of the at least one assigned physical property.

2. The method according to claim 1, further comprising adjusting the light pattern starting from the light pattern of a preceding time step, the adjusting occurring for each time step the output is clocked by the projection device.

3. The method according to claim 1, wherein the virtual physical interaction relates to an object in the environment described by the measurement data.

4. The method according to claim 3, wherein:
the virtual physical interaction comprises an attractive force and/or repulsive force between the object and the at least one of polygon feature to which the at least one physical property is assigned, and/or
the virtual physical interaction describes a virtual energy input and/or energy extraction which is represented by brightening or darkening of projection brightness of the polygon surfaces and/or an increase or deceleration of a speed of movement of the at least one polygon feature, and/or
the virtual physical interaction relates to an adhesion of at least one of the corner points to the object.

5. The method according to claim 3, further comprising:
assigning an item of acoustic output information to at least one interaction event of the virtual physical interaction, the item of acoustic output information being output outside the motor vehicle when the at least one interaction event occurs, and/or by an acoustic output means acting on an interior of the motor vehicle.

6. The method according to claim 1, wherein at least one environmental feature describes an environmental state.

7. The method according to claim 1, wherein determining the item of adjustment information including being based on at least one additional item of information of a vehicle function.

8. The method according to claim 7, wherein the additional item of information describes a transition from a current illumination region of the light pattern in the projection region to a new illumination region of the light pattern in the projection region, which transition is desired by a vehicle function, the transition taking place over a plurality of time steps by a movement and/or an addition and/or a removal of polygon surfaces to form the new illumination region, whose formation is described by a sequence of items of adjustment information.

9. The method according to claim 7, wherein the vehicle function is a driving function for fully automatic driving of the motor vehicle.

10. The method according to claim 1, further comprising
specifying an illumination region of the projection region by a lighting function of the motor vehicle, wherein the illumination region is smaller than the polygon mesh; and
determining a portion of the polygon mesh to be displayed by superimposition of the polygon mesh with the specified illumination region; and
projecting only the portion of the polygon mesh.

11. The method of claim 1, further comprising determining of the polygon mesh of the initially predetermined light pattern by:
generating, by a generation function, a point cloud within the projection region describing the corner points;
defining the polygon surfaces by a connecting function of the corner points; and
assigning projection brightnesses to the polygon surfaces by an assignment function.

12. The method according to claim 11, wherein the generation function comprises a Poisson disk sampling.

13. The method of claim 11, wherein the generation function defines triangles as the polygon surfaces without overlapping while maximizing minimum angles of the triangles.

14. The method of claim 11, wherein the generation function comprises assigning brightness values to the polygon surfaces based on an at least two-dimensional first gradient noise.

15. The method according of claim 1, wherein the adjusting the item of adjustment information further includes taking into account a randomized and/or physically based virtual basic dynamic which is superimposed on the virtual physical interaction.

16. The method according to claim 15, wherein movement of the corner points within a framework of the basic dynamic takes place based on a two-dimensional second gradient noise, wherein a circular path provided for the movement is adjusted by the two-dimensional second gradient noise.

17. A motor vehicle comprising:
a headlight device comprising a projection device, wherein the projection device is configured to:
project a light pattern in a projection region of the projection device, wherein the light pattern is initially predetermined and the projection region is predetermined, and wherein the light pattern in a polygon operating mode of the headlight device comprises:
a polygon mesh with polygon surfaces having polygon edges defined by projection points as corner points, wherein the polygon surfaces are at least partially assigned different projection brightnesses, and wherein at least one physical property is assigned to at least one polygon feature of the polygon surfaces; and
a control unit configured to control the projection device, wherein the control unit is configured to:
record operating data of the motor vehicle and/or measurement data of the motor vehicle, which describe a current driving state of the motor vehicle and/or current environmental features relevant to the at least one physical property in an environment of the motor vehicle encompassing the predetermined projection region;
specify, by the control unit, an environment model based on the operating data and/or measurement data, at least for the projection region; and
adjust the polygon mesh before outputting the light pattern, the adjusting being based on a computationally determined item of adjustment information that describes a virtual physical interaction of the polygon surfaces with the environment model on the basis of the at least one assigned physical property.

18. The method according to claim 6, wherein the environmental state comprises a weather condition.

* * * * *